US009877499B2

(12) United States Patent
Henry et al.

(10) Patent No.: US 9,877,499 B2
(45) Date of Patent: Jan. 30, 2018

(54) METHOD FOR PROCESSING FOOD PRODUCT AND FOOD PRODUCT THEREOF

(75) Inventors: Christiani Jeya Kumar Henry, Oxford (GB); M. Rajendran a/l V. Marnickavasagar, Petaling Jaya Selangor Darul Ehsan (MY)

(73) Assignee: HOLISTA BIOTECH SDN. BHD., Petaling Jaya, Selangor Darul Ehsan (MY)

( * ) Notice: Subject to any disclaimer, the term of this patent is extended or adjusted under 35 U.S.C. 154(b) by 0 days.

(21) Appl. No.: 13/825,903

(22) PCT Filed: Sep. 22, 2011

(86) PCT No.: PCT/MY2011/000206
§ 371 (c)(1),
(2), (4) Date: Mar. 25, 2013

(87) PCT Pub. No.: WO2012/039598
PCT Pub. Date: Mar. 29, 2012

(65) Prior Publication Data
US 2013/0189411 A1 Jul. 25, 2013

(30) Foreign Application Priority Data
Sep. 24, 2010 (MY) .......................... PI 2010004463

(51) Int. Cl.
*A23L 2/00* (2006.01)
*A23L 1/217* (2006.01)
(Continued)

(52) U.S. Cl.
CPC ................ *A23L 1/217* (2013.01); *A23L 5/11* (2016.08); *A23L 19/18* (2016.08); *A23L 29/015* (2016.08);
(Continued)

(58) Field of Classification Search
CPC ................... A23V 2002/00; A23V 2200/3324
(Continued)

(56) References Cited
U.S. PATENT DOCUMENTS 2,950,975 A * 8/1960 Hervey .......................... 426/542
5,192,566 A * 3/1993 Cox et al. ........................ 428/89
(Continued)

FOREIGN PATENT DOCUMENTS

EP 0607002 A2 7/1994
EP 1900289 A1 3/2008
(Continued)

OTHER PUBLICATIONS

Ballard, Application of Edible Coatings in Maintaining Crispness of Breaded Fried Foods, Thesis, Virginia Polytehni Insitute and Sate Univeristy, Sep. 17, 2003.*
(Continued)

*Primary Examiner* — D Lawrence Tarazano
*Assistant Examiner* — Philip Dubois
(74) *Attorney, Agent, or Firm* — Brian C. Trinque; Alan W. Steele; Lathrop & Gage LLP

(57) ABSTRACT

The invention relates to a method for processing at least one food product. For example, the invention relates to a process of preparing cooked food products, for example fried food products with reduced oil content. A two-step process is performed on the food product before cooking or frying. The food product is first contacted with a first composition comprising at least one divalent cation (e.g. Ca2+ and/or Mg2+) and at least one acid (e.g. carboxylic acid). After removing from the first composition, the food product is contacted with a second composition comprising okra, a part thereof, or an extract thereof, and at least one hydrocolloid.
(Continued)

The invention also relates to the compositions used as well as to the food product or at least one such fried food product with reduced oil content.

21 Claims, 1 Drawing Sheet

(51) Int. Cl.
  *A23L 5/10*    (2016.01)
  *A23L 29/00*   (2016.01)
  *A23L 29/25*   (2016.01)
  *A23L 19/18*   (2016.01)
  *A23L 33/20*   (2016.01)
  *A23P 20/10*   (2016.01)
  *A23L 1/01*    (2006.01)

(52) U.S. Cl.
  CPC ............... *A23L 29/03* (2016.08); *A23L 29/25* (2016.08); *A23L 33/20* (2016.08); *A23P 20/105* (2016.08)

(58) Field of Classification Search
  USPC ......................................................... 426/322
  See application file for complete search history.

(56) References Cited

U.S. PATENT DOCUMENTS

| | | | |
|---|---|---|---|
| 5,464,642 A * | 11/1995 | Villagran et al. | 426/439 |
| 5,620,727 A | 4/1997 | Gerrish et al. | |
| 6,013,294 A * | 1/2000 | Bunke et al. | 426/120 |
| 6,124,248 A | 9/2000 | O'Bryant et al. | |
| 6,261,618 B1 * | 7/2001 | Gerrish et al. | 426/303 |

FOREIGN PATENT DOCUMENTS

| | | |
|---|---|---|
| EP | 1905311 | 4/2008 |
| EP | 2130442 | 12/2009 |
| JP | 2008048719 | 3/2008 |
| JP | 2008067682 | 3/2008 |
| JP | 2009191045 | 8/2009 |
| WO | 2007/041682 A1 | 4/2007 |
| WO | 2008015652 A2 | 2/2008 |

OTHER PUBLICATIONS

Ahad, H A et al. "Fabrication and in vitro Evaluation of Glibenclamide Abelmoschus esculentus Fruit Mucilage Controlled Release Matrix Tablets," Journal of Pharmacy Research 2010, 3, pp. 943-946.

Hassan, H M et al. "Studying the Interaction Between Some Plant Polysaccharides and Potato Starch Amylose," Journal of Applied Sciences Research 2010, 6, pp. 89-96.

Nussinovitch et al. (1998) "Hydrocolloid Coating of Foods: A Review," Leatherhead Food RA Food Industry Journal. 1:174-188.

Woolfe et al. (1977) "Studies on the Mucilages Extracted from Okra Fruits (*Hibiscus esculentus* L.) and Baobab Leaves (*Adansonia digitata* L.)," J. Sci. Food Agric. 28:519-529.

Ameena et al., "Isolation of the mucilages from Hibiscus rosasinensis linn. and Okra (*Abelmoschus esculentus* linn.) and studies of the binding effects of the mucilages" Asian Pacific Journal of Tropical Medicine (2010)539-543.

Bajaj et al., "Gellan Gum: Fermentative Production, Downstream Processing and Applications" Food Technol. Biotechnol. 45 (4) 341-354 (2007).

* cited by examiner

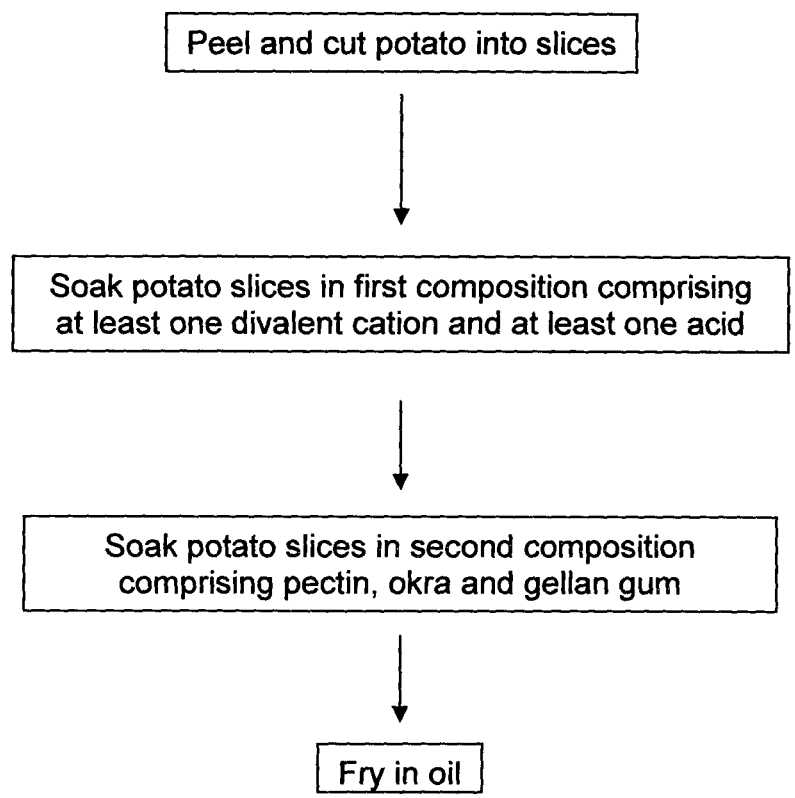

METHOD FOR PROCESSING FOOD PRODUCT AND FOOD PRODUCT THEREOF

RELATED APPLICATIONS

This application is a 35 U.S.C. § 371 filing of International Patent Application No: PCT/MY2011/000206, filed on Sept. 22, 2011, and which claims priority to Malaysia Patent Application No: PI 2010004463, filed Sept. 24, 2010. The entire contents of the aforementioned applications are hereby incorporated herein by reference.

FIELD OF THE INVENTION

The present invention relates to a method for processing at least one food product. In particular, the method reduces fat and/or oil absorption of the food product.

BACKGROUND OF THE INVENTION

Fat and/or oil is often used in any cooking process, for example in frying. Food products may already contain fat and/or oil. During cooking, oil may be absorbed by the food product. For example, frying is a popular process in food preparation. In particular, during frying, oil is absorbed by the food products. Managing the fat and/or oil content of food products is desirable. If the fat and/or oil content is too high, the food products may be too greasy or oily and appeal less to the consumer, especially since consumer trend is towards increasing health and nutrition awareness, with a preference for reduction of fat and/or oil in food products.

EP 0607002 relates to a process of preparing potato chips by blanching in a boiling mixture which includes gellan gum, followed by frying, conventional oven cooking or microwave oven cooking. The potato chips may then be frozen and later reconstituted in a microwave or conventional oven.

WO 2008/015652 relates to a coated fabricated snack piece substantially covered with a coating comprising a gum selected from alginates, cellulose derivatives, gellan, xanthan, arabic, pectin and mixtures thereof. The coated snack pieces are then fried.

EP 1900289 relates to a process of producing potato products having a low fat content by blanching potato slices in a solution comprising divalent cations at a temperature of 40° C. or more before frying and deoiling the potato slices.

Although attempts of reducing oil content in fried food products have been reported, there is still a need to develop improved processes to further reduce oil content during frying.

SUMMARY OF THE INVENTION

The present invention relates to a method for processing and/or treating at least one food product. Accordingly, the present invention relates to a method for processing at least one food product comprising, in any order, the steps of:
  (i) contacting at least one food product with a first composition comprising at least one divalent cation and at least one acid;
  (ii) contacting the food product with a second composition comprising okra, a part thereof, or an extract thereof, and at least one hydrocolloid.

According to one aspect, the method comprises, in any order, the steps of:
  (i) contacting at least one food product with a first composition comprising at least one divalent cation and at least one acid;
  (ii) contacting the food product resulting with a second composition comprising (a) pectin, (b) okra, a part thereof, or an extract thereof, and (c) gellan gum.

The present invention relates to a process of treating food products before cooking, including but not limited to frying.

The method of the invention is for reducing fat and/or oil absorption of the food product. By using the process according to any embodiment of the present invention, it has been found a reduction of more than 30%, in particular around 40%, in oil content of the fried product.

According to a particular aspect, the present invention provides a process of preparing at least one fried food product comprising the steps of:
  (i) contacting at least one food product with a first composition comprising at least one divalent cation and at least one acid;
  (ii) contacting the food product resulting from step (i) with a second composition comprising (a) pectin, (b) okra, a part thereof, or an extract thereof, and (c) gellan gum; and
  (iii) frying the food product.

For any aspect of the invention, step (i) may be performed before step (ii) or step (ii) may be performed before step (i).

Preferably, the at least one divalent cation is $Ca^{2+}$ and/or $Mg^{2+}$.

There is also provided a food product prepared or obtainable by the method of the invention. There is also provided a fried food product prepared or obtainable by the method according to any embodiment of the process of the invention. Further, there is provided a package comprising the fried food product according to the invention. There is also provided a composition (i.e. herein also referred to as "second composition") comprising okra, a part thereof, or an extract thereof, and at least one hydrocolloid. For example, there is also provided a composition (i.e. herein also referred to as "second composition") comprising (a) pectin, (b) okra, a part thereof, or an extract thereof, and (c) gellan gum. There is also provided a combination; which may be in the form of a package, a kit or the like; comprising a first composition comprising at least one divalent cation and at least one acid and a second composition comprising okra, a part thereof, or an extract thereof and at least one hydrocolloid. For example, there is provided a combination, which may be in the form of a package, a kit or the like, comprising a first composition comprising a divalent cation and at least one acid and a second composition comprising (a) pectin, (b) okra, a part thereof, or an extract thereof and (c) gellan gum. In particular, there is also provided a combination; which may be in the form of a package, a kit or the like; comprising a first composition comprising $Ca^{2+}$ and/or $Mg^{2+}$ and at least one acid; and a second composition comprising (a) pectin, (b) okra, a part thereof, or an extract thereof, and (c) gellan gum.

BRIEF DESCRIPTION OF THE FIGURES

FIG. 1 shows the steps of an exemplification of the process of the invention. However, the process shown in FIG. 1 is for exemplification purpose only and it is not to be considered to be limiting the scope of the invention.

DEFINITIONS

"Blanch" or "blanching" refers to a process of exposing a food product to heating conditions which does not cook the food product. Usually blanching is performed by plunging the food product into a heated liquid and removing after a time. The time is not sufficient to cook the food product and may be from 1 to 30 minutes.

"Contact" or "contacting" refers to bringing two products together. Contacting includes dipping, blanching, soaking and the like.

"Dip" or "dipping" refers to plunging partially or entirely into a liquid. The duration of dipping may be from 3 to 10 minutes. For example, the duration of dipping could be 5 minutes.

Okra is a plant in the mallow family (also Malvaceae). Its scientific name is "*Abelmoschus esculentus*" and also "*Hibiscus esculentus*". In various parts of the world, it is known as Okra, Ochro, Okoro, Quimgombo, Quingumbo, Ladies Fingers, Gombo, Kopi Arab, Kacang Bendi, Bhindi (S. Asia), Bendi (Malaysia), Bamia, Bamya or Bamieh (middle east) or Gumbo (Southern USA).

Extraction (to extract): To remove a fluid component from plant material by physical and/or solvent-assisted means. In some instances, it is possible to extract a fluid component from plant material by soaking the plant material in a solvent, for instance water or other polar solvents. Alternatively, a fluid component can be extracted from plant material by boiling, comminuting, crushing, squeezing, mashing, chopping, macerating, homogenizing, etc., the plant material thereby releasing a fluid component from insoluble plant tissue. It may be beneficial to perform this physical process with or in a solvent, for instance water or other polar solvents, in order to separate the desired fluid component more fully from insoluble plant material. Such insoluble plant material may include, for instance, seed hulls, cell wall fragments, vascular tissue, or fibers. In any of these processes, it may be beneficial to heat the plant tissue, solvent, or mixture thereof to aid in or accelerate the release of the fluid component.

Extract of okra refers to a product obtained or separated from the okra plant. For the purpose of the present invention, the term "okra extract" or "extract thereof" comprises an okra mucilage. In particular, okra mucilage refers to a glue-like product from the okra plant.

Hydrocolloid refers to a colloid system wherein the colloid particles are dispersed in water.

The terms method and process are used interchangeably herein.

Mucilage: A plant product extracted from plants through either physical means (e.g. crushing) and/or solvent-mediated means (e.g. extraction using water). Mucilage is a crude mixture comprising intra- and/or inter-cellular plant cell constituents.

Food grade refers to safe for food use.

"Fry" or "frying" refers to a cooking process where the food is heated in the presence of a fat, including butter, margarine, lard or various types of oils.

"Soak" or "soaking" refers to immersing into a liquid.

DETAILED DESCRIPTION OF THE INVENTION

The present invention relates to a method of treating food products.

Accordingly, the invention provides a method for processing food products comprising, in any order, the steps of:
(i) contacting at least one food product with a first composition comprising at least one divalent cation and at least one acid;
(ii) contacting the food product with a second composition comprising okra, a part thereof, or an extract thereof, and at least one hydrocolloid.

The process of the invention includes a two-step treatment before cooking or frying as herein described. The two-step treatment reduces the oil content of the fried food products compared to cooking or frying without performing the treatment. The first step in the treatment involves contacting the food product with a first composition comprising at least one divalent cation and at least one acid. The second step involves contacting the food product with a second composition comprising okra, a part thereof or an extract thereof and at least one hydrocolloid. For example, the second step in the treatment involves contacting the food product which was subject to the first step with a second composition comprising pectin, okra or a part thereof or an extract of okra and gellan gum. In addition, the first and second steps may be reversed in order.

Contacting with the first and second composition may be for any suitable length of time. Contacting may be by blanching, dipping or soaking. For example, the contacting time could be from 3 to 10 minutes (e.g. dipping) or from 5 minutes to overnight (e.g. soaking). In particular, contacting by soaking in the composition is performed for an appropriate time period for the composition to penetrate the food product, for example 15 minutes. Contacting may also be performed by any method including but not limited to blanching, dipping and the like.

Accordingly, the method may comprise the steps of:
(i) soaking a food product with a first composition comprising a divalent cation and at least one acid; and
(ii) soaking the food product with a composition comprising okra, a part thereof, or an extract thereof, and at least one hydrocolloid.

For example, the method may comprise the steps of:
(i) soaking a food product with a first composition comprising 0.40% w/v calcium chloride and 0.10% w/v citric acid for approximately 5-15 minutes; and
(ii) soaking the food product resulting from step (i) with a second composition comprising (a) 0.20% w/v pectin, (b) 0.10% w/v okra, a part thereof, or an extract thereof, and (c) 0.20% w/v gellan gum for approximately 5-15 minutes.

After the two-step treatment, the food product may be cooked in any manner, for example, baking, barbecuing, boiling, broiling, braising, grilling, roasting, simmering, smoking, steaming and the like. The method of treatment reduces fat and/or oil absorption, in particular during cooking.

Alternatively, after the two-step treatment, the treated food product may be frozen, for example, for storage. The frozen treated food product may be thawed and/or cooked.

The method of the invention may be applied to any food product for which the reduction of oil/fat is desirable. In particular, the process of the invention may be applied to any fried food product for which the reduction of oil is desirable. Suitable food products may include but are not limited to, for example, meat, poultry, seafood, cheese, vegetables and snack products. Snack products include potato, tapioca, yam, cassava, fruit pieces and the like. The snack products also include fabricated snack products prepared from starch-based materials such as from potato, tapioca, cassava, yam, corn, rice, barley, sago, oat, wheat, bran, flour and the like. The snack products may be in any shape, but typically may be in the shape of slices or sticks. The slices may be flat, curved, wavy or ridged. Any of the food products as listed may also be battered. In particular, the food product (fried or not fried) according to the invention is a potato product. More in particular, a potato chip (piece).

Therefore, according to a particular aspect, the method according to the invention is a process for preparing potato chips. Accordingly, the method prepares at least one potato chip from a potato piece, comprising the steps of:
(i) contacting at least one potato piece with a first composition comprising at least one divalent cation and at least one acid;
(ii) contacting the potato piece with a second composition comprising okra, a part thereof or an extract thereof and at least one hydrocolloid.

In particular, the process prepares at least one potato chip from a potato piece, comprising the steps of:
(i) contacting at least one potato piece with a first composition comprising at least one divalent cation and at least one acid;
(ii) contacting the potato piece resulting from step (i) with a second composition comprising (a) pectin, (b) okra or part thereof or an extract thereof, and (c) gellan gum; and
(iii) frying the potato piece.

The invention further relates to a combination comprising a first composition comprising at least one divalent cation and at least one acid; and a second composition comprising okra, a part thereof, or an extract thereof, and at least one hydrocolloid. For example, the invention also relates to a combination comprising a first composition comprising at least one divalent cation and at least one acid and a second composition comprising (a) pectin, (b) okra or part thereof or an extract thereof, and (c) gellan gum.

Any divalent cation suitable for food may be used for the invention. Examples of suitable divalent cations include the alkaline earth metals, for example, $Mg^{2+}$ or $Ca^{2+}$. A combination of two or more different divalent cations may also be used. It will be understood that the divalent cations are present with counter ions suitable for use in food. The counter ions may include chloride, sulphate, carbonate, hydrogencarbonate, anions derived from carboxylic acids such as citrate, ascorbate, acetate, propionate, lactate and benzoate. A combination of two or more different salts may be used. In particular, the cation $Ca^{2+}$ is used with the counter ion $Cl^-$. The concentration of calcium chloride used in the first composition may be in the range of 0.4-0.6% w/v.

Any acid suitable for food may be used for the invention. For example, carboxylic acids may be used for the invention. In particular, carboxylic acid such as citric, ascorbic, lactic or malic, or a combination of acids thereof may be used. The first composition may comprise an acid concentration in the range of 0.1-0.15% (w/v). In particular, the acid may be citric acid.

In particular, the first composition comprises 0.40% calcium chloride and 0.10% w/v citric acid.

Any edible oil may be used for cooking or frying the food product, for example, sunflower oil, corn oil, soybean oil, cottonseed oil, canola oil, peanut oil and combinations thereof. Butter, margarine or lard may also be used for frying.

The invention further relates to a composition (i.e. a second composition) comprising (a) pectin, (b) okra or part thereof or an extract thereof, and (c) gellan gum.

Okra or any part thereof of the okra plant thereof or an extract of okra may be used in the second composition. The extract of okra may be prepared according to any standard technique. For example, an extract of okra may be a water and/or an alcohol soluble extract of okra. In particular, an extract of okra may be prepared by boiling okra or a part thereof in water. Okra mucilage may be used, as okra extract, in the second composition. The okra mucilage may be prepared by any known process. For example, the process described in Ameena et al., (2010)(the whole content of which is herein incorporated by reference). As an alternative to the process described in Ameena et al., (2010), ethanol may be used in the precipitating step instead of acetone. A method of preparing okra mucilage is also described in U.S. Pat. No. 6,124,248.

Any hydrocolloid may be used for the invention. For example, the hydrocolloid may be a polysaccharide-based hydrocolloid or a protein-based hydrocolloid. Examples of polysaccharide-based hydrocolloid include but are not limited to agar, alginic acid, ammonium alginate, arabinogalactan, bakers yeast glycan, calcium alginate, carboxymethyl cellulose, carob bean gum, carob bean powder, carrageenan, cellulose, cross-linked sodium carboxymethyl cellulose, curdlan gum, ethyl cellulose, ethyl hydroxyethyl cellulose, fenugreek gum, furcellaran, galactomannan, gellan gum, guar gum, guar seed powder, gum arabic (Acacia gum), gum ghatti, hydroxypropyl cellulose, hydroxy propyl methyl cellulose, karaya gum, konjac glucomannan, konjac flour, locust bean gum, methyl cellulose, methyl ethyl cellulose, microcrystalline cellulose, oat gum, pectin, potassium alginate, powdered cellulose, processed Euchema seaweed, propylene glycol alginate (propane-1,2-diol alginate), sodium alginate, sodium carboxymethyl cellulose, sodium carboxymethyl cellulose (enzymatically hydrolysed), soybean hemicellulose, tara gum, tara seed powder, tragacanth gum and xanthan gum.

The polysaccharide-based hydrocolloid of the second composition may be selected from any member of the afore-mentioned group of polysaccharide-based hydrocolloid.

Examples of protein-based hydrocolloid include but are not limited to sodium caseinate, soy protein isolate, wheat gluten, whey protein isolate and gelatine. The protein-based hydrocolloid may be selected from any member of the afore-mentioned group of protein-based hydrocolloid.

The second composition comprises at least one hydrocolloid but may comprise any combination of two or more hydrocolloids.

The hydrocolloid, gellan gum, commercially available from Kelco (Bajaj et al., 2007) for example, may be used for the invention. The hydrocolloid, pectin, for example commercially available from Kelco, may also be used for the invention.

Any other suitable sources of pectin, okra or part thereof or okra extract and gellan gum may also be used for the invention.

The second composition may comprise (a) 0.2-0.3% w/v pectin, (b) 0.1-0.2% w/v okra (for example in the form of okra extract, optionally in the form of okra mucilage), and (c) 0.2-0.3% w/v gellan gum.

In particular, the second composition comprises (a) 0.20% w/v pectin, (b) 0.10% w/v okra, a part thereof, or an extract thereof, and (c) 0.20% w/v gellan gum.

According to another aspect, the invention also relates to a food product with reduced oil content prepared or obtainable by the process described herein. The food product may be conventionally packaged. The packaging may be to maintain crispness, such as vacuum packaging or packaging with an inert gas, such as nitrogen. Accordingly, the invention also relates to a package comprising at least one such fried food product.

EXAMPLES

Having now generally described the invention, the same will be more readily understood through reference to the following examples which are provided by way of illustration, and are not intended to be limiting of the present invention.

Example 1

Six potatoes were used in the study. Each potato was peeled and cut into half. One half was the control sample and the other half was the test sample. Each half was then cut into thin slices for making fried potato chips. For the test samples, the potato slices were first soaked in the first composition comprising 0.40% w/v calcium chloride and 0.10% w/v citric acid in water for approximately 5-15 minutes. The potato slices were removed from the first composition and drained, before soaking in a second composition comprising 0.20% w/v pectin, 0.10% w/v okra mucilage and 0.20% w/v gellan gum for approximately 5-15 minutes. All the components used for the first and second composition were food grade.

The potato slices were then removed from the second composition and deep fried in hot oil to form crispy potato chips. The potato slices of the control group were fried directly.

The oil content of the potato chips of each of the 12 samples (test+control) were measured using the Soxhlet process (Nielsen, 2003) and compared to the oil content of control potato chips which did not undergo the two-step treatment before deep frying.

The oil content of the control chips is shown in Table 1.

TABLE 1

Oil content of control deep fried potato chips

| Control | Oil content (%) |
|---|---|
| 1 | 8.1 |
| 2 | 8.5 |
| 3 | 8.8 |
| 4 | 8.0 |
| 5 | 8.0 |
| 6 | 8.3 |
| Mean ± SD | 8.3 ± 0.31 |

The oil content of experimental deep fried potato chips prepared by the process described above and the reduction of oil observed in these potato chips compared to the control is shown in Table 2.

TABLE 2

Oil content of experimental deep fried potato chips and the reduction of oil content compared to control deep fried potato chips.

| Sample set | Oil content | Reduction in oil content (%) compared to control |
|---|---|---|
| 1 | 5.1 | 37 |
| 2 | 5.3 | 38 |
| 3 | 5.2 | 41 |
| 4 | 5.0 | 38 |
| 5 | 4.9 | 39 |
| 6 | 5.2 | 37 |
| Mean ± SD | 5.1 ± 0.147 | 38 ± 1.450 |

The mean reduction in oil content was observed to be 38±1.450%, with a significant p-value of <0.05. The p-value was determined by one-way ANOVA.

A reduction of almost 40% in oil content is considerable in terms of energy regulation, since this would approximate to 100-200 kcal reduction in energy consumption per day if a subject is eating fried food regularly as part of their diet. Accordingly, the fried food product which has undergone the two-step treatment is a healthier option compared to the control.

REFERENCES

Ameena of al., (2010) Isolation of the mucilages from *Hibicus rosasinensis* linn, and Okra (*Abelnoschus esculentus* linn.) and studies of the binding effects of the mucilages. Asian Pacific J. Trop, Med, 2010: 539-543

Bajaj et at, (2007) Gellan gum: Fermentative production, downstream processing and applications. Food Technol. Biotechnol. 45(4):341-354.

Nielsen, S. Suzanne (2003) Food analysis, Kluwer Academic, 3$^{rd}$ edition

EP 0607002

WO 2008/015652

EP 1900289

U.S. Pat. No. 6,124,248.

The invention claimed is:

1. A method for reducing fat or oil absorption of at least one food product comprising the steps of, in any order:
   (i) contacting at least one food product with a first liquid composition comprising $Ca^{2+}$ and citric acid; and
   (ii) contacting the food product with a second composition comprising okra or okra mucilage, and pectin or gellan gum, wherein contacting with the first composition and the second composition is effective for reducing the fat or oil absorption of the food product upon cooking or frying as compared to a control food product not so contacted with the first composition and the second composition.

2. The method according to claim 1, wherein the first composition further comprises ascorbic, lactic or malic acid or a combination thereof.

3. The method according claim 1, wherein the second composition further comprises a polysaccharide-based hydrocolloid or a protein-based hydrocolloid.

4. The method according to claim 3, wherein the polysaccharide-based hydrocolloids is selected from the group consisting of agar, alginic acid, ammonium alginate, arabinogalactan, bakers yeast glycan, calcium alginate, carboxymethyl cellulose, carob bean gum, carob bean powder, carrageenan, cellulose, cross-linked sodium carboxymethyl cellulose, curdlan gum, ethyl cellulose, ethyl hydroxyethyl cellulose, fenugreek gum, furcellaran, galactomannan, guar gum, guar seed powder, gum arabic (Acacia gum), gum ghatti, hydroxypropyl cellulose, hydroxy propyl methyl cellulose, karaya gum, konjac glucomannan, konjac flour, locust bean gum, methyl cellulose, methyl ethyl cellulose, microcrystalline cellulose, oat gum, pectin, potassium alginate, powdered cellulose, processed Euchema seaweed, propylene glycol alginate (propane-1,2-diol alginate), sodium alginate, sodium carboxymethyl cellulose, sodium carboxymethyl cellulose (enzymatically hydrolysed), soybean hemicellulose, tara gum, tara seed powder, tragacanth gum and xanthan gum.

5. The method according to claim 3, wherein the protein-based hydrocolloid is selected from the group consisting of sodium caseinate, soy protein isolate, wheat gluten and whey protein isolate.

6. The method according to claim 1, wherein the second composition comprises (a) pectin, (b) okra or okra mucilage, and (c) gellan gum.

7. The method according to claim 1, wherein the first composition comprises 0.1-0.15% w/v citric acid or 0.4-0.6% w/v calcium chloride.

8. The method according to claim 1, wherein the first composition comprises 0.40% w/v calcium chloride and 0.10% w/v citric acid.

9. The method according to claim 1, wherein the second composition comprises (a) 0.2-0.3% w/v pectin, (b) 0.1-0.2% w/v okra or okra mucilage, and (c) 0.2-0.3% w/v gellan gum.

10. The method according to claim 1, wherein contacting comprises soaking.

11. The method according to claim 1, comprising the steps of:
(i) soaking a food product with a first composition comprising $Ca^2$ and citric acid; and
(ii) soaking the food product with a composition comprising okra or okra mucilage, and pectin or gellan gum.

12. The method according to claim 1, comprising the steps of:
(i) soaking a food product with a first composition comprising 0.40% w/v calcium chloride and 0.10% w/v citric acid for approximately 5-15 minutes;
(ii) soaking the food product resulting from step (i) with a second composition comprising (a) 0.20% w/v pectin, (b) 0.10% w/v okra or okra mucilage, and (c) 0.20% w/v gellan gum for approximately 5-15 minutes.

13. The method according to claim 1, further comprising cooking the food product in oil or fat or freezing the food product after the two steps.

14. The method according to claim 13, further comprising thawing the food product after freezing the food product and/or cooking the food product.

15. The method according to claim 1, wherein the method is a process of preparing at least one fried food product comprising the steps of,:
(i) contacting at least one food product with a first liquid composition comprising $Ca^{2+}$ and citric acid;
(ii) contacting the food product resulting from step (i) with a second composition comprising (a) pectin, (b) okra or okra mucilage, and (c) gellan gum, in any order; followed by (iii) frying the food product.

16. The method according to claim 15, wherein contacting comprises soaking.

17. The method according to claim 15, comprising the steps of:
(i) soaking a food product with a first composition comprising 0.40% w/v calcium chloride and 0.10% w/v citric acid for approximately 5-15 minutes; followed by
(ii) soaking the food product resulting from step (i) with a second composition comprising (a) 0.20% w/v pectin, (b) 0.10% w/v okra or okra mucilage, and (c) 0.20% w/v gellan gum for approximately 5-15 minutes; and
(iii) frying the food product.

18. The method according to claim 1, wherein the food product is a potato product.

19. The method of claim 1, wherein the reduced fat and/or oil absorption of the product compared to the control product comprises about 30%.

20. The method of claim 1, comprising the steps of:
(i) contacting at least one food product with a first liquid composition comprising $Ca^{2+}$ and citric acid; followed by
(ii) contacting the food product with a second composition comprising okra or okra mucilage, and pectin or gellan gum, wherein contacting with the first composition and the second composition is effective for reducing the fat and/or oil absorption of the food product upon cooking or frying as compared to a control food product not so contacted with the first composition and the second composition.

21. The method of claim 5, wherein the protein-based hydrocolloid comprises sodium caseinate.

* * * * *